H. J. FAUDEL.
SOIL TILLING MACHINE.
APPLICATION FILED FEB. 26, 1917.
1,260,279.
Patented Mar. 19, 1918.
2 SHEETS—SHEET 2.
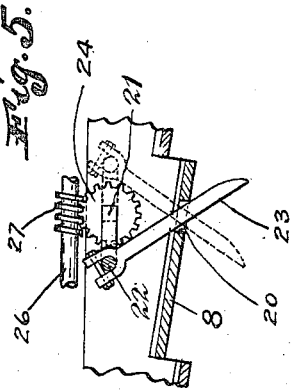
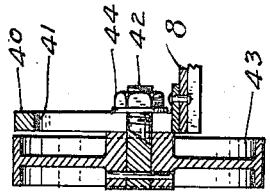
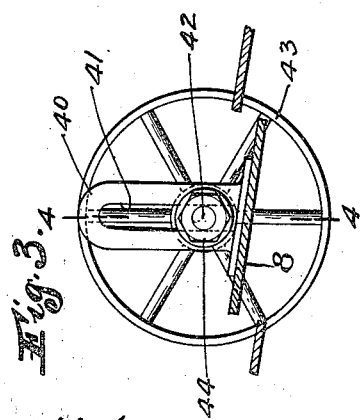
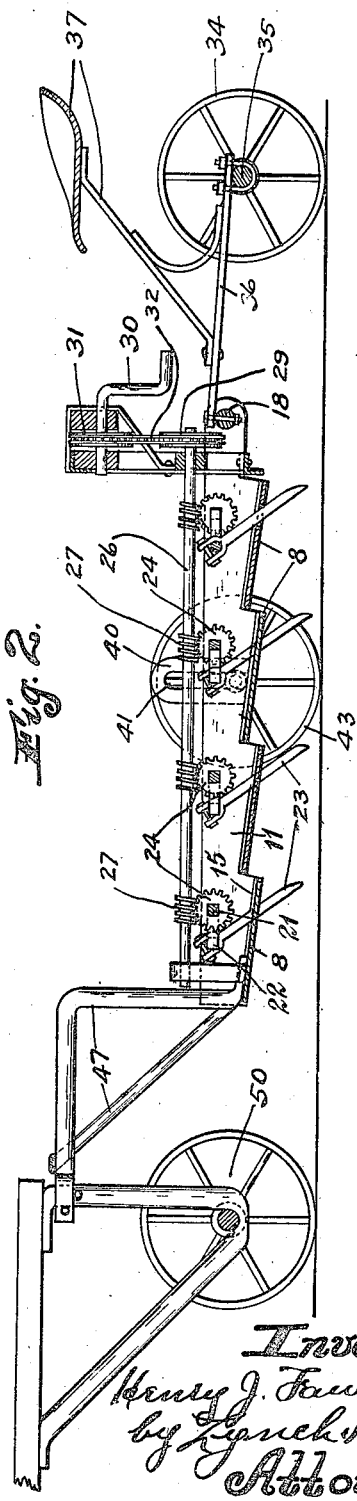

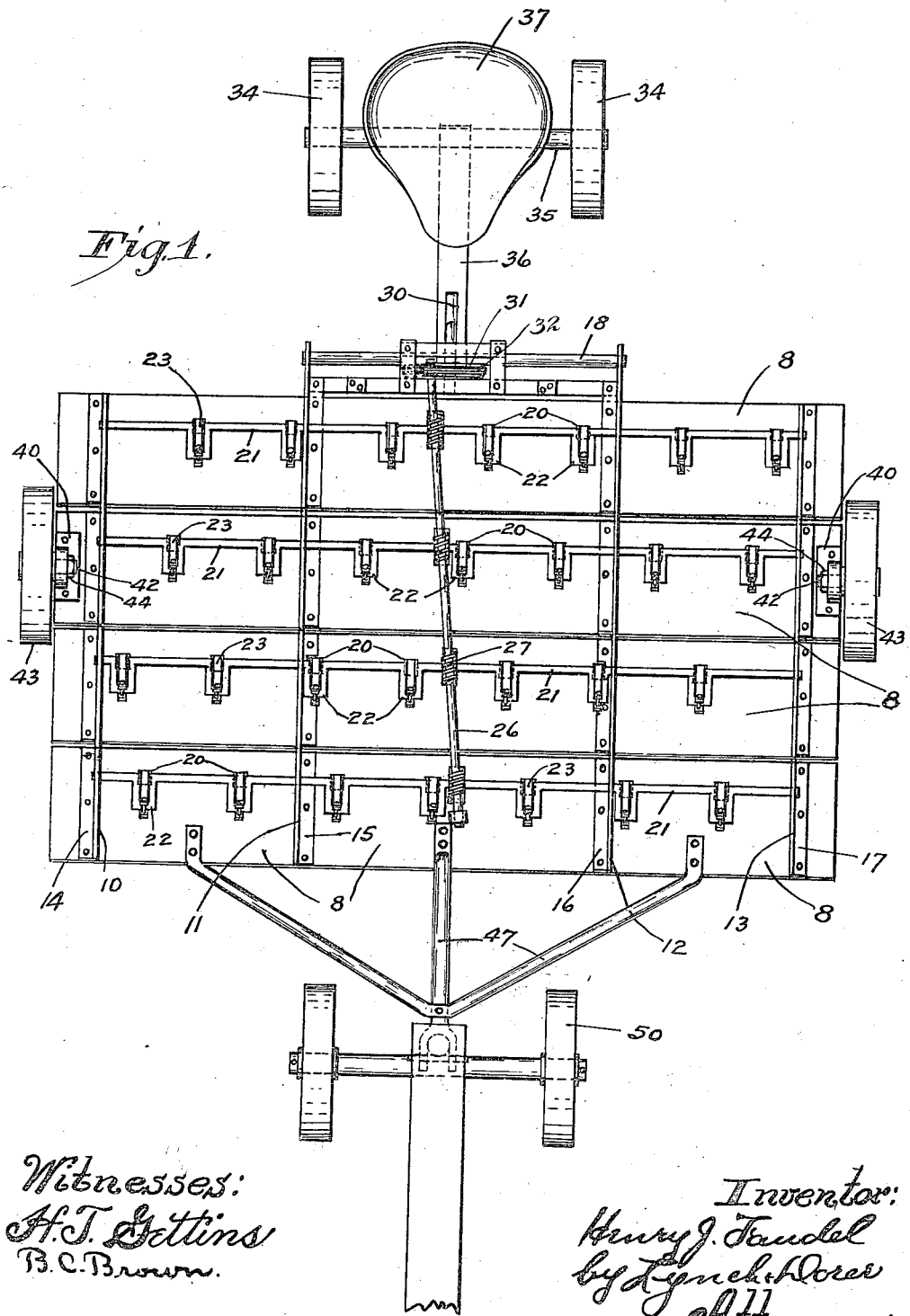

UNITED STATES PATENT OFFICE.

HENRY J. FAUDEL, OF INDEPENDENCE, OHIO.

SOIL-TILLING MACHINE.

1,260,279.  Specification of Letters Patent.  Patented Mar. 19, 1918.

Application filed February 26, 1917. Serial No. 150,870.

*To all whom it may concern:*

Be it known that I, HENRY J. FAUDEL, a citizen of the United States, residing at Independence, in the county of Cuyahoga and State of Ohio, have invented certain new and useful Improvements in Soil-Tilling Machines, of which the following is a specification.

This invention relates to new and useful improvements in soil tilling machines.

The object of this invention is to provide a device of this description which will combine in a single machine the advantages of a float, a spring toothed harrow, a disk harrow and a roller.

With this object in view and with the intention of securing other advantages which will hereinafter appear, this invention consists in certain features of construction and combination of parts, hereinafter described in the specification, pointed out in the claims and illustrated in the accompanying drawings.

In the accompanying drawings, Figure 1 is a top plan view of a machine embodying my invention. Fig. 2 is a sectional elevation on a line substantially through the middle of the machine front and rear. Fig. 3 is an elevation of one of the side wheels and the standard therefor looking outward and sections of the plates 8. Fig. 4 is a section on line 4—4, Fig. 3. Fig. 5 is a cross section of one of the crank shafts showing a tooth on one of the cranks in full lines and its possible position in dotted lines and the means for rotating the shaft.

The body portion of the machine is formed of a series of flat plates, shown at 8. These plates are arranged at an angle to the horizontal, the front end of each plate being higher than the rear end, and the rear ends of all plates are in the same horizontal plane so that when the body of the harrow is resting on the ground the rear ends of the plates rest on the ground and the front ends of the plates will be tilted up and elevated above the surface of the ground. The plates are connected together by a series of tie-plates, shown at 10, 11, 12 and 13 which are provided with flanges 14, 15, 16 and 17 which are secured to the plates by means of bolts or rivets. The tie plates 11 and 12 extend beyond the rear end of the rear plate, and in the projecting ends thereof is mounted a shaft 18. In each of the plates 8 are formed slots 20 out of line or staggered in respect to the slots in the other plates, and above each plate is mounted a shaft 21 which carries a series of cranks 22 which are arranged directly over the slots 20. From each crank is hung a tooth or prong 23 which is removably mounted on the crank so that it may be readily replaced if it becomes injured or broken. On each of the shafts 21 is secured a pinion 24. Above the shafts 21 is arranged a shaft 26, and on said shaft 26 are formed worm gears 27 which are arranged to mesh with the gears or pinions 24. On the rear end of said shaft 26 is mounted a sprocket wheel 29. Above the sprocket wheel is arranged a crank arm 30 on which is a sprocket wheel 31, and the said sprocket wheels are connected by a sprocket chain 32. By turning the crank handle the shaft 26 will be driven which drives the pinions 24, which rotates the crank shafts 23. Now, as these crank shafts are rotated in one direction they will draw up the teeth, and when rotated in the opposite direction they will lower the teeth, and if the shaft be rotated through a half a revolution it will cause complete reversal in the direction of the inclination of the teeth so that the teeth will be caused either to slant forward or slant backward by simply turning the crank handle, which can be readily manipulated from the seat. The rear wheels of the machine are shown at 34. The wheels are connected by an axle 35, and to the center of the axle is secured one end of a bar 36, and the other end of the bar is secured to the shaft 18. On the said bar is mounted a seat 37. At each side of one plate 8 of the body of the harrow is mounted a vertically arranged standard 40 in which is a slot 41, and in the said slot is arranged a stud shaft 42 on the outer end of which is secured a wheel 43, and on the inner end a nut 44 so that the said wheels are both adjustably and removably connected to the body of the harrow. To the front of the harrow is secured a draw bar 47, and this draw bar is arranged to be adjustably secured to a truck 50.

In Fig. 2 the device is shown provided with wheels so that it can be readily transported from field to field and could also be used for cultivating corn and the like. When the machine is to be used as a harrow, the side wheels are entirely removed and the front wheels may also be removed, but if the front wheels are not removed the point of attachment to the front wheels is lowered so as to permit the body of the harrow to move down until the steel plates rest upon the surface of the ground. The angle of the teeth or knives and also the depth at which they penetrate the ground is then adjusted by turning the crank handle. The teeth of the plates are preferably arranged two inches apart taking the teeth as a whole. Now, it will be readily seen that the steel plates crush many of the lumps and press others into the ground and hold them while the knives or teeth rip through them every two inches and to such a depth as the teeth are set. Hence, it is readily seen that the whole apparatus constitutes a two inch mesh or gage through which all surface earth must pass as deep as the teeth are set or the cutting is desired.

The machine therefore does the work of the usual three tools generally employed. The steel plates both break the lumps and level the ground the same as a roller, and the teeth cut up the lumps so that a disk harrow is not necessary.

What I claim is:—

1. In a soil tilling machine, a series of rotatable transverse shafts having cranks at intervals, teeth pivoted on said cranks and adapted to be tilted to different angles forward and back, and means engaging said teeth between their ends to hold the teeth at work.

2. A soil tilling machine having a series of plates transversely inclined downward from front to rear and provided each with a series of transverse slots, in combination with a series of shafts over said plates adapted to be axially rotated and a series of teeth pivotally mounted on said shafts and projecting through said slots and adapted to be tilted therein by the rotation of said shaft.

3. A soil tilling machine having a series of transversely disposed rotatable shafts provided each with a plurality of cranks in the same plane, teeth pivotally mounted on said shafts and plates beneath said shafts having slots for said teeth adapted to hold the teeth to the predetermined working position.

4. A soil tilling machine having a series of rotatable shafts provided each with a series of cranks and teeth pivoted on said cranks, in combination with a series of fixed plates beneath said shafts having slots penetrated by said teeth, and means to rotate the said shafts simultaneously and thereby fix the working depth and the angle of said teeth.

5. A soil tilling machine having a series of transversely disposed shafts having each a series of cranks, teeth mounted on the said cranks having crotched ends and bolts through said crotches fixing the teeth removably on said cranks.

6. In soil tilling machines, a series of transversely disposed shafts adapted to be rotated within limits and provided each with a series of cranks in the same plane, in combination with straight teeth pivoted on said cranks and means engaging the teeth between their ends and adapted to hold the teeth in alinement.

7. In soil tilling machines, a machine having a series of transversely disposed plates inclined downward from front to rear and provided with transverse slots at intervals between their ends, a corresponding series of axially rotatable shafts having cranks coincident with said slots, teeth engaged through said slots and pivoted on said cranks, pinions on said shafts and means adapted to rotate all said pinions simultaneously and thus give said teeth different inclinations.

8. A soil tilling machine comprising a series of plates, means for connecting said plates together so that each plate is inclined at an angle to the horizontal, slots formed in said plates, teeth arranged in said slots, and means for raising and lowering and for changing the angle of said teeth.

9. A soil tilling machine comprising a body portion consisting of a series of flat plates, means securing said plates together so that each plate is inclined at an angle to the horizontal, each of said plates being provided with a series of slots, a crank shaft extending longitudinally above each plate, the crank portions of said shafts registering with the slots in the plates, teeth hung from the crank portions and extending down through said slots, pinions secured on said crank shafts, a shaft arranged transversely of the crank shafts and provided with worm gears arranged to mesh with said pinions, a sprocket wheel secured on the end of said transverse shaft, a sprocket wheel mounted above said first-mentioned sprocket, a crank handle for rotating said sprocket and a sprocket chain connecting said sprocket wheels, for the purpose set forth.

Signed at Cleveland, in the county of Cuyahoga, and State of Ohio, this 17th day of February, 1917.

HENRY J. FAUDEL.

Witness:
A. N. DIETZ.